(12) United States Patent  
Lewolt

(10) Patent No.: US 7,918,666 B1
(45) Date of Patent: Apr. 5, 2011

(54) INTERACTIVE COMPUTER NETWORKED STUDY AID AND GUIDE

(75) Inventor: Bruce Lewolt, Newbury Park, CA (US)

(73) Assignee: BrainX.com Inc., Camarilla, CA (US)

( * ) Notice: Subject to any disclaimer, the term of this patent is extended or adjusted under 35 U.S.C. 154(b) by 0 days.

(21) Appl. No.: 10/031,806

(22) PCT Filed: May 8, 2000

(86) PCT No.: PCT/US00/12686

§ 371 (c)(1),
(2), (4) Date: Nov. 19, 2003

(87) PCT Pub. No.: WO00/70582

PCT Pub. Date: Nov. 23, 2000

(51) Int. Cl.
*G09B 3/00* (2006.01)

(52) U.S. Cl. ..................................... 434/322

(58) Field of Classification Search .......... 434/156–185, 434/322–365; 273/302, 430–431
See application file for complete search history.

(56) References Cited

U.S. PATENT DOCUMENTS

| | | | | |
|---|---|---|---|---|
| 5,727,950 A | * | 3/1998 | Cook et al. | 434/350 |
| 5,822,744 A | * | 10/1998 | Kesel | 434/322 |
| 5,890,911 A | * | 4/1999 | Griswold et al. | 434/322 |
| 5,907,831 A | * | 5/1999 | Lotvin et al. | 705/14 |
| 6,024,577 A | * | 2/2000 | Wadahama et al. | 434/322 |
| 6,112,049 A | * | 8/2000 | Sonnenfeld | 434/350 |
| 6,139,330 A | * | 10/2000 | Ho et al. | 434/322 |

FOREIGN PATENT DOCUMENTS

WO  WO 98/13807  *  4/1998

OTHER PUBLICATIONS

Study on Student Cheating Finds Profd Make a Difference; Science Daily: Jul. 1998; retreieved from www.sciencedaily.com/releases/1998/07/980708085624.htm on Jun. 19, 2007.*

* cited by examiner

*Primary Examiner* — Xuan M Thai
*Assistant Examiner* — Timothy Musselman
(74) *Attorney, Agent, or Firm* — Steve P. Hassid; Silicon Edge Law Group LLP

(57) ABSTRACT

An interactive study aid provides student- or other source-selected (208) questions for studying. Preferably in conjunction with machine-implemented or other information processing, the interactive study aid of the present invention provides a student with the ability to acquire, present/study, and collaborate upon study material (202) information. Acquisition of study material (202) information may be made through soft-text resources such as digital books or online resources. A pen scanner may be used to access hard copy information making pertinent portions available to the interactive study aid. Study material information may also be entered by hand. Upon entering the study material, the student can indicate the likelihood of its appearing on a test or the importance of the information to the student. Study sessions orchestrated by an Intelligent Learning Agent guide the student towards that material he or she is the most interested in either for tested/evaluated course work for a grade or for self study and interest.

98 Claims, 3 Drawing Sheets

INTERACTIVE COMPUTER NETWORKED STUDY AID AND GUIDE

TECHNICAL FIELD

The present invention relates to machine-implemented study systems and more particularly to a system where the student may select information to be studied and receive support with respect to test- or subject-specific information.

BACKGROUND ART

Every student finds that there is some effort required in order to understand the subject material being studied. Particularly for grade-oriented courses or subject matter, many students seek to achieve a high grade and make the most use of their study time. By efficiently studying, the student may have more time for other activities including recreational and other fun activities.

In studying materials, students may often use notes in order to review and recall the subject matter taught in the classroom. Additionally, such notes may be taken by hand in the review of study materials such as books, texts, and the like. By engaging in processes of memorization and repetition, the student may come to understand the material better, especially when tests are imminent. Many students spend an enormous amount of time preparing study guides, flash cards and other devices to help them study material. The preparation of these study materials is boring and tedious. The student may also give him- or herself (as used herein, the masculine pronoun is meant to include the feminine) a self test so that the student may evaluate himself and his understanding of the subject matter.

Such studying may be considered burdensome by the student. Coupled with sometimes-enforced attendance in classroom lectures or the like, the process by which subject matter may be understood by a student or person may be viewed with dread or dismay as the imposition of artificial constraints force the student to undergo one form of discipline or another in order to achieve understanding of the subject matter. Even students that have the mental make up required to spend the amount of study time needed to get top grades report that they regretted all of the activities that they could not participate in because they had to spend so much time studying in order to reach their learning goals.

All students have a limitation on the amount of time that they can spend studying. Unfortunately, the nature of current study techniques leads many students to spend their limited study time inefficiently. Add to this the problem that it takes a certain amount of time to get study materials organized and to begin studying effectively. This means that if a student only has a small amount of time available that could be used for studying say, 5 to 20 minutes, this time is often not effectively used.

Generally, many people are interested in the world, curious about the different aspects of it, both natural and cultural. Additionally, people often find that the act of studying is not so burdensome save that it requires discipline and diligence. Consequently, it would be of some advantage to the student to provide a system that lessened the burden as much as possible on the student with respect to studying. The subject matter must still be studied, but the process of studying may be one that is made the least burdensome so as to afford the student the greatest enjoyment in studying. By providing an environment in which the student is the least burdened with the act of studying, a spark of interest may be brought to the fuel of knowledge, thereby providing an upward spiral of intellectual activity for the student: the subject matter is interesting to the student which prompts more studying by the student which prompts more interest.

Software systems in the past have been established and made available to students. These often include rote scripts that take the student through a particular course of study or a part thereof. The art apparently lacks a system by which the student may designate the material to be studied and then have the system present to him that material. It would be of additional advantage to have such a system that would allow pre-processed materials to be incorporated by it, so that it might aid the student. It would be an additional advantage to provide such a system that is easily handled by the student and that operates to forward the studying process as much as possible by a machine-implemented system. Finally, it would help the student if the way in which this material was presented was customized, as by machine, to the way that individual student best learned that type of information.

Many students concentrate their study time on memorization. Current study techniques do not encourage students to do associative learning. This type of studying causes the user to think about how the items they are memorizing relate to one another and/or how the information they are studying relates to information that they already know. This type of studying when combined with memorization provides a powerful learning combination as the student not only learns the particular elements of a subject by rote memorization, but also the associative interrelations important to a more complete understanding.

Many people never reach their full learning potential because they can not study effectively. This is bad for the individual and bad for society. The reasons that they may be ineffective at studying could be that they do not know how to effectively study, that the way they learn best does not fit well with normal study techniques, and/or that they have some difficulty like attention deficit disorder that makes it extremely difficult to organize study material and focus on the material to be learned. The present invention compensates for each of these problems and allows students to reach their full learning potential.

Even when material is learned with traditional study methods, it is often lost or forgotten in a few weeks or months. It is difficult for the student to reorganize and relearn the information for a comprehensive examination or for use in a future job where the may suddenly find that they need to remember information that they once learned 5 or 10 years ago in school.

DISCLOSURE OF INVENTION

The present invention provides a machine-implemented system and method for aiding the student or user in studying subject matter. In a first aspect of the present invention, acquisition of materials is made into the system by the student in obtaining and designating materials from which questions may be derived. Such questions may be acquired through pre-processed materials such as the author of a textbook or a professor of a course. In a second aspect of the present invention, the now-acquired information (generally in the form of questions and background materials) is then presented to the student in an efficient manner so that the student might perform as well as possible on tests. The presentation mode is spontaneously engageable so that in via the five minutes between classes, etc., the student may engage in a quick and advantageous self-study session in order to better understand the materials. In presenting the acquired information in the form of questions (user selected and otherwise), the present invention selects queries based on user needs and places, or prioritizes, those queries into a study session and then takes the user through that study session.

In the third aspect of the present invention, the system allows for collaboration of large and small study groups in order to allow the efforts of one student to be shared with others. The student may limit the scope of such sharing or provide it indiscriminately. Such study groups may be helped by a professor or author who posts or otherwise makes available questions or study materials via the shared database.

Additional aspects of the system of the present invention include the ability of the student to rate the probability of questions being on a test. Particularly, certain questions may be asked at certain points in course work such that instructors may indicate explicitly that certain questions may be on the exam while certain ones may not. Especially for pre-processed materials, the student could choose those questions which are most subject to system-presented review. Furthermore, as means by which the student can gauge his expectations, the system may query the student as to the accuracy of his expectations. The system may present those questions the student thought were to be on the exam and confirm whether or not such questions actually were included.

The interactive study aid of the present invention is not limited to students taking classes in school. The interactive study aid of the present invention is unique because it works for all types of users as opposed to most educational software that is geared to a specific age range or educational level. The present interactive study aid works as well for someone involved in life long learning like a doctor or lawyer as it does for someone in a corporate or government training program as it does for a high school or college student. The interactive study aid of the present invention even works for the person who just wants to study material for a hobby or to learn jokes.

Once material has been learned, the invention stores the material in a way where it can be quickly recalled by the user and where the user can restudy the material in the same way he originally learned it. In addition the user may choose to be quizzed on some material on a regular basis to ensure that they always remember it and can use the information.

Further detail and description of the present invention is set forth below with respect to particular aspects of it.

MODE(S) FOR CARRYING OUT THE INVENTION

Figure 1:
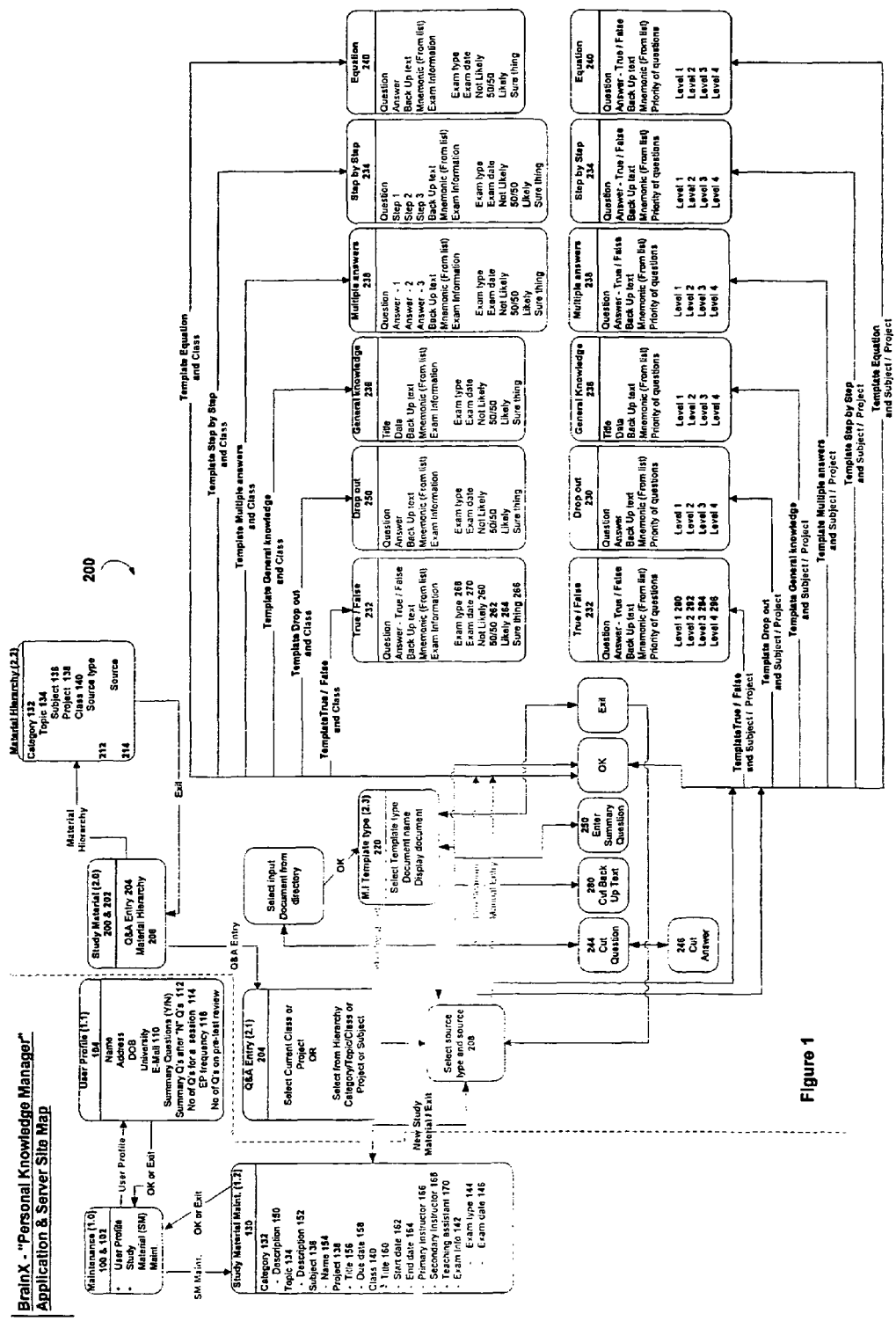
FIG. 1 shows an Application and Server Data Flow and Entity Relationship diagram for the maintenance and study material subfunctions of the present invention.

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The present invention provides means by which students can use information processing machines such as computers in order to aid their study efforts. As set forth in the accompanying drawings, and as set forth in more detail below, the student is able to designate or incorporate questions and/or material for questions so that they may be presented to the student in an efficient, advantageous, and manageable manner. In so doing, and in combination with electronic information processing resource and communication systems, the present invention provides a novel and flexible manner by which a student may accomplish his or her studies. The use of the masculine pronoun herein is intended to incorporate the feminine and vice versa.

As shown in the figures, the Interactive Study Aid of the present invention has several subfunctions. These include a maintenance subfunction 100, a study material subfunction 200, a study session subfunction 300, a utility subfunction 400, a study group subfunction 500, a server tool subfunction 600, and a login subfunction 700. As used herein, reference numbers in the drawings are generally associated with the subfunction to which they refer. That is, the 100 series of reference numbers refers to the maintenance subfunction, while the 400 series of reference numbers refers to the utilities subfunction. The same is similarly true for the server tools subfunction 600 and the login subfunction 700.

By coordinating orchestration of the subfunctions of the system of the present invention, the interactive study aid of the present invention is achieved. The particular operation of the present invention is set forth in more detail below.

As shown in FIG. 1, the maintenance subfunction 100 has a general entry point 102 that establishes initial conditions for the specific implementation of the Interactive Study Aid of the present invention. A user profile 104 is elicited from the user and provides default, background, or identifying information regarding the user. Beyond personal information such as the name, address, and date of birth of the user, the user's university and e-mail address may also be provided in the user profile section 104. Additionally, certain frequency settings may be made which operate with respect to other features of the present system. In particular, and as set forth in more detail below, the requirement of a summary question may be designated 110, as well as the frequency of such summary questions 112. Additionally, the number of questions for each session as well as the frequency regarding an excitement package may also be specified. Additionally, the number of questions in a pre-test review can be set by the user.

For the foregoing, the default conditions may be as follows: by default, summary questions 110 are present, and the frequency 112 for such summary question is defaulted to 7 with a range of 2-30. With respect to the number of questions for each session 114, the default may be 30 with a range of 5-9999. The excitement package frequency 116 may be determined with respect to the number of hours and/or the number of minutes between each excitement package. By default, the excitement package frequency may be set to occur every 20 minutes with a range on the order of 5 minutes to 90 minutes.

The default number of questions on a pre-test review 118 may be 20 and may range from 5-9999. For the last four settings (114-118), volume bars or analog indicators may be used alongside each of the values.

Upon selecting the elements, fields, or information in the user profile 104, the user may save changes and/or exit to the main subfunction menu, the general maintenance entry point 102. As will be noted by those familiar with software systems and operations, any single one or all of the user preferences, including the number of questions for the session 114, the excitement package (EP) frequency 116 and the pre-test number of questions 118 may be made available from other points in the Interactive Study Aid of the present invention.

In a hierarchical manner of design, the user may indicate and designate different subjects of study in the study material maintenance function 130. The user may access the study maintenance material subfunction 130 via the maintenance subfunction 100 or otherwise. In the study maintenance material subfunction 130, a hierarchical classification of materials and subject matters may be provided. As shown in FIG. 1, each category 132 may have one or more topics 134. Each topic 134 may have one or more subjects 136. Under each subject 136, may be a number of projects 138 and/or classes 140. Within each class 140 there may be one or more exams 142, each having its own type 144 and date 146. Additionally, there may be any number of categories 132 within the study material maintenance subfunction 130. In fact, as the student progresses through several years of course work, the study material maintenance subfunction 130 may comprise a large number of such categories.

For example, categories may include: history, mathematics, economics, physics, chemistry, art, languages, literature, and humanities, among others as well as hobbies, jokes and stories and other non-academic categories. Each of these may have their own topics 134, subjects 136, projects 138, and/or classes 140. Each subelement to the study material maintenance subfunction 130 may have its own description or accompanying information. For example, a description 150 may accompany the category 132, as well as a description 152 for the topic element 134. A name 154 may be associated with the subject 136. A title 156 and a due date 158 may be associated with each project 138, and for each class, their may be associated a title 160, a start date 162, and end date 164, a primary instructor 166, a secondary instructor 168, and a teaching assistant 170.

Additional descriptive and/or text or information may be associated with the elements of the study material maintenance subfunction 130.

Having fulfilled, accessed, modified, or created the information needed or required for the user profile 104 of the study material maintenance 130, the user may then more advantageously use the other subfunctions of the present invention. As shown in FIG. 1, the study material subfunction 200 may provide means by which questions and answers are entered, as well as segregating or sorting those questions and answers by pertinent criteria. Additionally, the sources for such questions and answers may also be subject to categorization, sorting, or segregation. A study materials subfunction entry point 202 gives the student access to either the question and answer entry subfunction 204 or the material hierarchy subfunction 206.

In the material hierarchy subfunction 206, study materials may be selected from different categories 132, topics 134, subjects 136, projects 138, and classes 140. With respect to classes, the source type 212 and source 214 of materials may be designated.

In the question and answer subfunction 204, the class 140, project 138, or subject 136 may be selected and the questions and answers entered during the session may then be associated with that selected class, project, or subject. Once such questions and answers are established, they can also be copied or transferred over to different classes, subjects, or projects. Additionally, such questions or answers may be shared with other users of the Interactive Study Aid system of the present invention as set forth in more detail below.

Upon entering into the question and answer entry subfunction 204, the user then selects the source type 212 and source 214 at step 208. Generally, there may be a number of sources available, including books, notes, articles, Internet resources, and other resources. For books, information regarding the title, authors, publishers, and copyright years may be included with the information regarding the book. For notes, such notes might be personal notes or notes received from others. Identifying information, as well as dates of the notes, might also be included as descriptive information for the notes. With respect to articles, the title, source, author, and date published may be associated as identifying or descriptive information for the article. For Internet resources, the site name URL (Universal Resource Locator), author, title, and other notes may be associated with the Internet site. With respect to other information, identifying information as necessary may be associated with the other type of information, including the name, date, or other information and notes regarding the information.

Designating the source type is advantageous in that it gives the user the means by which to segregate information. A student or user may be interested in studying or entering answers to questions from a specific source, and by indicating the type of source, the student or user may then take advantage of a more focused study session. Another advantage of designating and saving the source type is that days or years later, when the student is studying this information and has additional questions, he can look at the source information and use it to find the source from which the information was taken. In addition, the invention has the capacity to tell the user the exact page number or part of the source from which a particular piece of information was taken.

Once the source type and source have been selected 208, the user then enters the questions and answers entry mode where the user can select one of three questions and answers entry modes. The user can manually enter the questions and answers. The user may use a soft copy such as a digital book or other electronic or digitized information, either on his computer or over a computer network including the Internet. The user may then use the mouse to enter the questions and answers by marking them with the mouse. Thirdly, the user may use a pen scanner, such as the QL Pen Scanner, which allows the user to input lines of text from hard copy by rolling the pen scanner over the line of text. This then converts the hard copy text to an electronic copy that is easily handled by the interactive study aid of the present invention. The present invention includes functions that reside on the pen scanner to prompt the user to capture information in the proper sequence to maximize its use by the system of the present invention.

Once the user has selected the mode through which questions and answers have been entered, the user may then proceed onto a marker input/exit template 220. Upon entry into the marker input/exit template 220, the user is allowed to select one of several question and answer template types including: a dropout template 230 that allows the creation of a single question with a single answer, a true or false template 232 that allows the creation of a single question with a single Boolean answer which would be either true or false, a step-by-step template 234 that allows the creation of a single question with multiple answers (in one embodiment, with a maximum of three answers). Additional templates include: a general knowledge template 236 that provides a single field for the title and a single field for the entry of data, a multiple answer template 238 that provides for the creation of a single question with multiple answers (in a preferred embodiment, a maximum of three answers), a joke or story template (not shown) that includes a section for the joke and another for the punch line along with a use history where the user can record the date(s) they told the joke, the person or group they told it to, and the response from the person or group they told the joke to, and an equation template 240 where a single question may be created having a single answer. There may be special templates for handwritten information that are the same as each of the other templates except that they are designed to handle handwritten text as picture or graphics files. Handwritten information templates may also include duplicate fields where the user may type in a copy of the handwritten information.

Upon selecting a template type, the user may then proceed into the question and answer creation process by which questions of the template type are created from the designated source. If a soft or electronic copy of the information is available, then the question and answer marker function is called, which allows creation of questions and answers from either scanned text, a digital book, or the like. When pen scanning is used, a pen scanner function is available in order to orderly process the scanned text and make it available for the question and answer creation process. If questions and answers are to be created manually, the manual question and answer function is then used to create the questions and answers.

Depending upon the type of template selected, question and answer presentation may differ accordingly. For example, if a multiple answer template type is selected, then a single question field with, for example, three answer fields may be displayed so that the empty fields may be filled with the questions and answers, respectively. Where a soft copy of the text is available, the question and answer marker function may be used that allows the user to manually select the questions and answers from a soft copy of the study material. Using a mouse or other pointing device, the question, the answer, other data, back-up text, and mnemonics may be designated from the soft text.

In example of the question and answer marker function, the user may highlight the part of the paragraph or the sentence with a pointing device that may form the question. The highlighted question is then cut 244 and may be shown in a different color. Such colors may change from question to question. Upon designating the question, the user then highlights the part of the paragraph or sentence that forms the answer and then designates the highlighted text as by cutting it 246 from the soft text. The present invention places the question in the question portion of the template and then cuts text selected as the answer from the question and inserts an underline in the place of the text that has been cut out to leave a blank to be filled in by the student-supplied answer. The answer is placed in the answer portion of the template.

Upon so designating both the question and the answer, the user then may then set the likelihood of the question appearing in an exam. As shown in FIG. 1, the user may specify for classes the likelihood of the question appearing on the exam. For projects or subjects, the user can specify a priority level with respect to the question. With respect to the classroom exams and the like, the user, for example, may indicate the likelihood of the question appearing on the exam as being "not likely" 260, a "50/50" probability 262, "likely" 264, and "sure thing" 266. The Interactive Study Aid of the present invention can then select certain of these questions, depending upon their likelihood of being on an exam. The user or student may also indicate the exam type 268 and, perhaps in association with the exam type, the exam date 270 on which the newly-created question may appear. The user may also assign an priority number that would allow the user to sort data into different sections and then prioritize each piece of data in each section. Upon creating both the question and the answer, as well as designating the likelihood of the question being on the exam, the user may proceed with creating more questions and answers of the same template, a different template, or return to the study material entry point 202.

In order to prevent the copying of questions and answers created by the user without going through a central server, encryption techniques could be used upon the created questions in order to restrict their portability.

With respect to the pen scanner, the user may first scan the subject matter with the pen scanner that would compose the question. Editing may occur of the scanned material, and then the answer may be scanned by the same pen scanner. Editing may occur with respect to the scanned answer so that a question and answer pair could be created through the pen scanner scanning printed or handwritten hard copy text. A batch processing function may also be part of the present invention, in that questions and answers may be scanned in tandem, so that a number of question and answer pairs are scanned in sequentially so that they may be edited into questions and answers at a later point or contemporaneously with the scanning session. The page number that a question and answer was scanned from can also be scanned. Back up text to a question can also be scanned. As for the question and answer marking function set forth above, upon establishing a question and answer pair, the user may indicate the likelihood of its appearance on its exam or priority as far as subject matter. As for all questions and answers created by the user, encryption techniques may be used to restrict portability.

When the user manually enters questions and answers, the same process set forth above occurs, save that manual entry is used to create the questions and answers. Upon creating the questions and answers, the user then sets the estimated likelihood of a question appearing on the exam or sets the priority of the subject matter. Back-up text and mnemonic aids may be selected from a list or a mnemonic creation function may be invoked to create a mnemonic for the answer to the question. The question may then be saved and return then may be made back to the study material entry point 202.

After the user has created a number of questions and answers, the Interactive Study Aid of the present invention queries the user for a summary question 250 as set in the summary question after "N" questions 112 parameter in the user profile 104. For example, if the number of questions for each summary question is set to eight, after the creation of eight questions, the user may be asked to create a summary question or to indicate a summary question that covers as much information possible from the prior eight questions. The user can also choose to enter a summary question at any time. When manually activated, the user is shown questions created in this manner. When the summary question template is activated, the user is prompted to think of things that promote relational learning. This could include considerations as to how do these questions relate to one another and how do these questions relate to what I (the student) already know. This automatic pop up summary question feature is optional and can be turned off in the user profile if required or necessary.

In order to provide additional information for the student should the question and answer not provide enough subject matter from which the student can understand the material, a backup text creation and selection function 280 may be provided. The backup text function allows the user to select or enter backup text for the current question depending upon the current question and answer entry mode. If soft text is available, the user can select a page or group of sentences or paragraphs as backup text in association with the question.

Otherwise the user enters manually the backup text to be associated with the question and answer. If a pen scanner is available, the text scanned into the Interactive Study Aid of the present invention is then designated as backup text and associated with the question and answer. The system as set forth herein may check to detect if the same backup material is being used for too many questions. If so, an alert or other event may be delivered to the user.

Mnemonics often form a part of students' examination preparation so that they can easily remember a greater amount of material by remembering a mnemonic related to the material. There are many different types of mnemonics. For example, acrostics may be used where each letter in a word stands for something a person is trying to remember and/or pictures that help a student remember data. For some subject matters, such as the Linnaean classification system, mnemonics have been developed for the kingdom, phylum, class, order, genus, and species organization used by that classification system. When subject matter pursued by the student is perceived as being susceptible to the mnemonic, the mnemonics function (not shown) may provide a list of mnemonics with a selected category during the study material entry process. The user, at his option, may create his own mnemonic. Upon the creation by the user of his own mnemonic, transfer may be made to a central database to allow other users to benefit from the created mnemonic. The same user may be able to get mnemonics of other people when he logs into or is otherwise connected to the Internet. Restrictions may be present in a shared database of mnemonics to ensure that indiscriminate copying does not occur. If the user chooses to create his own mnemonic, the present invention may prompt him through a process where the present invention helps them create and record a mnemonic.

A maintenance function may be provided whereby the questions and answers from a selected class, project, or subject may be displayed or listed in their entirety. In so reviewing all the questions, modification of the questions, answers, backup text, mnemonics, and priorities can be made.

Figure 2:
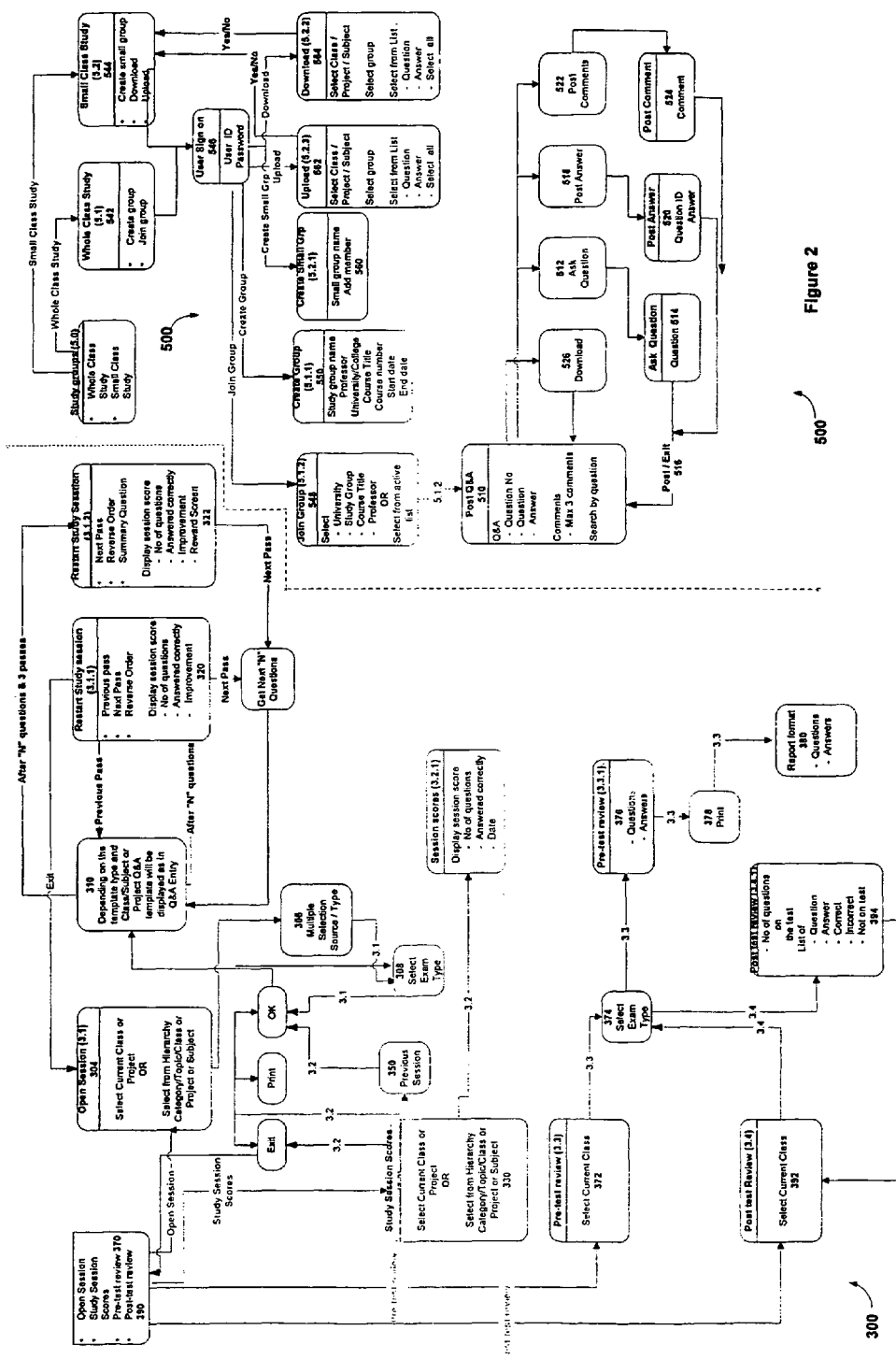
FIG. 2 shows an Application and Server Data Flow and Entity Relationship diagram for the Study Session and Study Group subfunctions.

Referring now to FIG. 2, the study session subfunction 300 provides means by which the individual user or student may study the subject matter in the form of the previously-generated questions. Upon opening the study session by engaging the study session entry point 302, the user is able to begin a study session by selecting a current class or project or traverse the category hierarchy as shown in step 304. Depending on the class project or subject, the user may display a list of source types in a tree-view architecture so that the user may select both the source type and the source of materials to be studied 306. One or more sources may be used during a study session, and an option may be made available to study all available sources. For the class type of study material, that is study material for a specific class, a default exam type may be implemented and confirmed by user selection. Otherwise, the subject matter may be displayed according to an Intelligent Learning Agent (ILA) so that the student may more efficiently study and achieve understanding of the subject matter in question. Questions are then presented to the user as selected by the Intelligent Learning Agent.

The user can either enter the answer or view the answer depending upon the template type, and may be supported by backup text, mnemonics, hints, or a "show answer" function. When answering the question and comparing it to the correct answer, the user may then be able to grade the question by indicating a type of grade. Such grading types may include: "correct and easy," "correct but difficult," and "incorrect." In one embodiment, the default grading type may be "correct and easy." During the question and answer study session, the user may be able to select the exam type for which and the exam date on which the question might be expected. Additionally, the priority or likelihood of the question can be adjusted. As the user moves through the questions of the question and answer study session, the number of questions for the session and the position of the current question in that session may be displayed to the user with the process continuing until the user ends the session. In one embodiment, the user may have an option to go back to a previous question, as well as being informed of the current session score.

Should the user require backup text, mnemonics, or hints, the user may call for them through the appropriate subfunctions associated with the question and answer session. Additionally, hints may be provided as well, with the answer being revealed letter by letter or in some similar manner until the answer appears. Consequently, the user can be afforded the challenge of answering the question on his own, even though part of the answer is revealed.

Should the user so desire, he may re-engage a previous question and answer study session 350.

Once a user has finished a study session, the results of the session may be displayed 320. Additionally, the user may be led through the study session three times until the session results are displayed 322. The repeated passes through the study session may take place in the same order, reverse order, or in random order. In reverse order mode, the answer may be given and the student required to furnish the question. Additionally, results may be shown as by indicating the number of questions in total, the number answered correctly, and the improvement from one pass or session to another. Furthermore, an animated reward screen may be displayed to motivate the user. A pie chart diagram or some other graphic may be used to indicate to the user the number of questions attempted, the ones correctly answered but easy, the ones correctly answered but difficult, and the ones answered incorrectly. The study session information may be saved for future reference, and the user can start a new question and answer session, repeat the previous session 350, or return to the study session entry point 302 or a main or umbrella interface function. Should the user desire to examine all study session scores of a class, subject, or project or a selected exam type or otherwise, a function 350 may be provided so as to provide such summary information.

The user may select to engage a pre-test review function 370, which initially inquires as to which class the pre-test review should cover 372. An exam type is then selected 374, and a pre-test review is then given 376. The pre-test review may be printed 378 for off-line review and the report format defined 380 for the printout. As with the study session, the user may select the source or sources that may be used in the pre-test review. In selecting the exam type, the default exam type may be the one that is temporally closest as indicated by the user. If no class is associated with a subject or if no exam is due, this option may not be used. During the pre-test review, the questions are displayed or printed out with the answers so that the user may have them available for study. The print out may physically separate the results in columnar format with entry marks available for self-examination.

One possible print out format is where the questions are printed on the left hand ⅔rd of the paper and the answers on the right ⅓. Under each answer is a box where the user can mark if he got the question "correct but easy," "correct but difficult", or "incorrect". This may be repeated 3 times so the user can record the results of 3 passes over each question and answer. The answer box could be located under the answer or to the right of the answer. When the user returns to his computer, he can manually enter the results of the answers. In one embodiment, the user may place the page with the marked results on a flat bed scanner and a computer (such as the one with the interactive study aid of the present invention) will scan and obtain the results that the user marked on the page and update the user's computer (or other) file(s).

The post-test review 390 is similar to the pre-test review in that a current class may be selected 392, as well as the exam type 374. In the post-test review 394, the number of questions on the test may be indicated by the user, as well as the questions, their answers, the number the user had correct, the number the user had incorrect, and the questions that were not on the test. By recording this information, the user may get a gauge of the likelihood of questions on the test, as well as information regarding the professor and how he or she tests. Such information may be shared with future students of the course, such information being uploaded to a common database or the like. Earlier users may have shared similar information with a present user.

In providing or prioritizing the questions that are used during the study session 310, the Intelligent Learning Agent (ILA) captures information about user activity, performance, preferences, parameters, and the like in order to decide which questions to display during the study session, their sequence, as well as the length of time between entertainment events also called the excitement package. This engine also selects the pre-test review questions in order to make more efficient the user's study time. The Intelligent Learning Agent tracks how well the user has learned the questions and answers in the question and answer database and combines this information with other information specific to the user. Such specific information may include how likely each question is to appear on the test or otherwise. The Intelligent Learning Agent may prioritize which question may be shown in the specific study session and the order in which they are asked.

Where a class has been indicated by the user, the ILA may first prioritize the questions by the exam type. The ILA may then prioritize the questions according to their likelihood of being on the exam as indicated by the user. A third priority used by the ILA may be the user awareness of the question as indicated by the evaluation provided by the user as to whether or not the answer was incorrect, correct but difficult, or correct but easy. As a fourth priority, if a user indicates "n" (a variable) consecutive successful or correct passes of a question as being correct but easy, that question may not be selected in the next pass.

With this process, a student may start out with 200 questions to learn for an exam. As the student masters the material, the list of questions he is reviewing gets smaller and smaller until he masters all of the questions. In this case, the variable "n" varies by how easy or hard it is for the user to learn this type of information. If the information is easy for the student to learn, "n" may be a low number. If difficult, a high number. The user can set this number, the user can use the system default value, or (over time) the ILA can set this number for each subject. The ILA may set this number by evaluating the user's post-test review results. For example, if the variable "n" was set at three for English and the student does poorly on English exams as reflected in the post-test reviews, then the ILA will increase the value of the variable n. If, however, the student does very well on his or her English tests, the ILA may reduce the value of n. This saves the user time that can be used to study other material or for other purposes.

As a fifth priority, after three passes, the ILA selects or allows only summary questions if a user selects only summary questions. If, however, the user specifies an incorrect answer to a summary question, then the questions under that summary question may be listed.

In addition to the priority system is the intelligent repeating of questions that is accomplished by the ILA. For example if an answer to a question has been indicated as incorrect by the user, that same question may be displayed after four questions in the same pass of the same study session. If the user specifies the answer to a question as correct but difficult, that particular question may be displayed after six questions in the same pass of the same study session. The number of questions asked before a question previously marked by the user as incorrect or correct but difficult may be varied by the user, set to system default, or set by the ILA in the same manner as the variable n is set for the number of successful passes required (priority four, above).

With respect to subjects or projects that are not subject to examination, questions may be prioritized depending on the level indicated (FIG. 1, Study Material 200), i.e., level one 290, level two 292, level three 294, and level four 296. A second priority is the user awareness of the question, as above, with respect to the answer being incorrect, correct but difficult, or correct but easy. Incorrect answers may cause the same question to be displayed after four questions in the same pass of the same study session, while correct or difficult answers may cause the associated question to be displayed after 6 questions in the same pass of the same study session. Priorities 4 and 5 with respect to the class type study review may be incorporated into the project/subject study review in the same way. Additionally, for the class study session, above, an additional priority may be the assignment of weight to each question depending to the last 6 responses. Those questions that are answered correctly 6 consecutive times may be weighted less than those that are answered incorrectly more times.

As also shown in FIG. 2, whole class and small class study groups may be established by coordinating separate installations or systems of the Interactive Study Aid of the present invention. These study groups 500 may be coordinated with the server or the like that allows coordination of operations and sharing of information. Questions may be posted, answers made to them, as well as any accompanying comments. Such questions, answers and comments may be posted directly to the server and distributed by means of an update function or the like. In one embodiment, questions may be posted anonymously, but answers may be identified as belonging to the person answering the question. Those who comment on such answers may also be identified and an option may be present so that those who ask questions can also be identified.

As shown in FIG. 2, the study group subfunction may have a post-question and answer subfunction 510, which may allow the asking of questions 512 where upon invoking the asked question subfunction 512, the question is then entered by the user 514 where it is then posted to the server 516. Similarly, an post-answer subfunction 518 may allow a user to post an answer to a question 520 where it is then posted during the post function 516. The post comments subfunction 522 allows the entry of comments 524 which may then be posted during the post function 516. Questions may be viewed, scanned, or searched, as well as specific question numbers called up for review by the user. Additionally, a download function 526 may be present allowing the downloading of questions. In one embodiment, a maximum of 100 comments may be made to questions and answers. However, such a limit may be a system parameter fixed by an administrator.

In executing the study group subfunction 540, the user may select from a whole class study group subfunction 542 and a small class study group, or small class group, subfunction

544. For each of these class study subfunctions, the user sign-on subfunction 546 restricts memberships to members of the appropriate group. The whole class study group 542 has a join subfunction by which users may join or be joined to the group. Upon being identified, the verified users may then proceed into the post question and answer subfunction 510 as described above. The join group subfunction 548 may require the entry of certain information including the university, study group, course title, and/or professor. This information may be selected from an active list or drop-down menu as appropriate. A create group subfunction 550 may create whole class study groups with the accompanying subsystems and databases needed in conjunction with the whole class study group. Specific information may be required such as the study group name, the institute or the courses being held, the title of the course, the number of the course, the name of the professor(s) and teacher(s), the date the study group starts, and the date that it ends. Generally, only authorized users of the Interactive Study Aid of the present invention may create groups, such as teachers and professors, persons they designate, or otherwise.

With respect to the small class study group, a create small group function 560 may provide the functionality to create small class study groups and the accompanying collateral functions and operations necessary to operate and maintain the small class study group. In some embodiments, any user may create a small class study group. In others, only certain designated individuals may create small study groups, or small study groups may be created according to the professor's preferences. Upon creation, certain information may be required in creating this small class study group, including the group name and user ID's. Upon creating the small class study group, uploads and downloads may be effected through an upload subfunction 562 and a download subfunction 564. In uploading and downloading information, the subject, class, and project may be indicated, as well as the small class study group to which uploads may be made or from which downloads may be available. All questions may be uploaded or downloaded according to the rules associated with the study group and/or the user.

Figure 3:
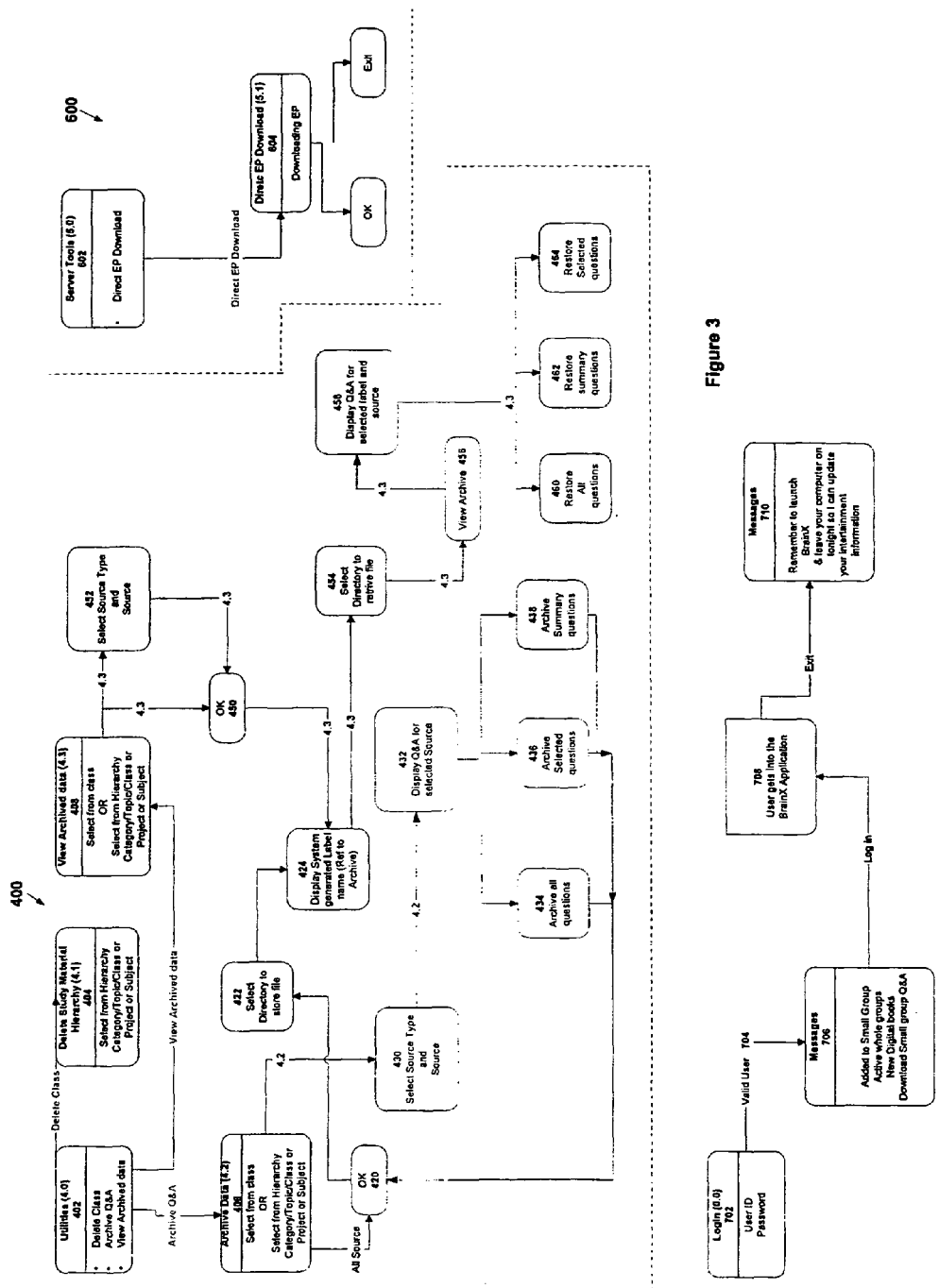
FIG. 3 shows an Application and Server Data Flow and Entity Relationship diagram for the Utilities, Server Tools, and Login subfunctions.

As shown in FIG. 3, server tools 600 may be available by which excitement packages (EPs) as well as advertisements may be stored, configured, maintained, and orchestrated. Additionally, keyed contents (contents that are pre-processed for incorporation into the Interactive Study Aid of the present invention) may be made available for download only from a central web server or other networked site to the individual client installations of the present invention. When keyed content is selected for download, that content can be encrypted to the user so once downloaded that encrypted material can only be used by the user's copy of the invention. Additionally, Intelligent Learning Agent (ILA) functions may automatically provide downloads to the client through the server tool 600.

Once the user logs into the central server or site, the user may be directed or instructed to download the required material if the same is not done automatically by the ILA. If purchase is necessary for the materials, transactions may be consummated via known or future-developed means of e-commerce or otherwise.

As shown in FIG. 3, the server tool entry point 602 may provide access or the like to an intelligent excitement function called the excitement package (EP). The excitement package is designed to keep the user's attention focused on the study session and to increase the user's retention of the information being studied. The excitement package may use videos, sounds, pictures, games, and/or special effects (such as animation) to provide a mental break for the student and a period of relaxation and restoration from the rigors of study. Entertainment packages also serve to engage the creative portions of the brain after exercising the academic portions of the brain during study. By providing excitement packages in the present invention, more of the student's brain and mind are engaged, leading to a more productive and interesting study session. The excitement package also helps make studying fun. Entertainment packages can occur at random intervals or may be scheduled to occur after certain time intervals or after a certain number of questions. After logging into the central website, system, or server (by the user or automatically by the ILA) via the server tools at entrypoint 602, entertainment package or packages may be downloaded to the user's computer or other device. The entertainment packages might then be available locally for display to the user.

As an alternative embodiment, in order to provide a sense of community between individual users of the Interactive Study Aid of the present invention, certain entertainment packages might be pre-programmed to occur at a specific time, including on a specific day or week, so that all members of a certain group experience the same entertainment package. This gives the users a shared common experience that provides a sense of community between different users of the Interactive Study Aid of the present invention and provides motivation for others to participate in it.

When a user initially activates the Interactive Study Aid of the present invention, initial questions may be asked to determine the user's ideal EP preferences, including the frequency, intensity and type of stimulation the user prefers. The user may also be allowed to select favorite types of EP's from a list. After study sessions, the stimulation or other settings can be altered or modified in order to conform better to the user's preferences. Such preferences may determine the type and scope of the EP downloads 604 that occur for the user. Additionally, upon experiencing an excitement package, the user may rate the excitement package by making a choice as, for example, by selecting a thumbs up icon for approval, a thumbs sideways icon for no real preference, and a thumbs down icon to indicate rejection of the excitement package.

Sponsorship of entertainment packages can occur through commercial advertising and the like. After an entertainment package is presented to a user, a banner ad, short clip, or otherwise could indicate the sponsorship of the ad much like commercial broadcast activity on television. The user may then also rate the advertisement by indicating the user preferences with respect to the presentation of the product or service via the advertisement and the product for service itself.

As also shown in FIG. 3, a utility subfunction 400 is present that allows users or authorized individuals to delete classes, archived questions and answers, and view archived data. The utilities subfunction entry point 402 allows the user to engage the delete study material subfunction 404, the archive data subfunction 406, and the view archive data 408.

In deleting materials through the delete study material subfunction 404, the user can scroll or travel through the hierarchy in order to delete certain portions of the study material. After designating the material to be deleted, the user activates the delete sequence and is given a warning prior to completion of the delete function. Upon confirmation in face of the warning, the materials are deleted and are generally not recoverable from the system.

In archiving data, old questions in study materials including soft copies of digital books and the like are archived with respect to their class or other designation through the hierarchy of categories and the like. Such archiving can take place via the archived data subfunction 406 by means of zip drives, hard disk drives, network computer drives, or the like. All sources may be archived 420 and if so, a directory or resource to which the archive is to occur must also be designated 422. A label name may be generated for the archive 424. The archive is then generated with the label attached, either logically or otherwise, so that it may be viewed at a later date or efficiently uploaded or transferred. Individual classes may be archived, or archives may be obtained by selection through the material hierarchy classification used in the present invention. When archiving does occur, such archiving does occur down to the lowest source level.

The user may also select that information be added to his or her active brain area. Information added to this area is reviewed on a schedule determined by the ILA to assist in keeping this information fresh in the user's mind. The present invention can keep certain selected information fresh in the user's mind by presenting it on a selectably ongoing basis to the user.

If individual source or sources are selected 430, then options are given with respect to the questions that are to be archived 432. The user may archive all questions 434, selected questions 436, or all questions except summary questions 438. Upon indicating the sources and questions for those sources to be archived, the storage directory is then requested 422, as above, and storage is effected with the generation of an appropriate label.

When archived data is to be viewed, the view archived data subfunction 408 is invoked and allows the user to view the archived questions and answers before restoring them. All questions and answers from an archive may be selected 450 or individual sources and their types may be selected 452. The user is able to selectively restore certain questions by selecting other particular classes or projects or other entries from the hierarchy configuration. Labels generated by the previous archiving process 406 might be selected from a drop-down menu or the like, and upon selection automatically seek the archived data. If the archived data is on a removable media, a message may be displayed requesting a particular media for the user to make available to the system. As archived files may be compressed in order to save space, once the correct label name is found on the media, all associated zip or compressed files may be displayed in a directory dialog or other dialog box. Specific files or questions and answers can then be indicated for decompression and, upon selection by the user, are restored to active status with respect to the Interactive Study Aid of the present invention. This process is shown in FIG. 3 where the label is generated or accessed by the view archived data subfunction 408 at step 424. The resource or drive is then selected 454 from which the files are available or may be retrieved. Those archived files may then be viewed 456, and certain or grouped questions and answers displayed 458. The user may select to restore all questions 460, restore summary questions alone 462, restore selected questions 464 or otherwise.

In FIG. 3, a login subfunction/process 700 is shown. In the central server subfunction 700, a login entry point 702 may request a user ID and/or password. Once the user is validated 704, a transload exchange subfunction 706 may be engaged. At the transload subfunction 706, the user via his user ID may be added to a small class study group, and engage the small class study group sections to which the user belongs. The same is similarly true for the whole class study groups and the available questions and answers. New digital books or other merchandise or services may be purchased or reviewed, and small group questions and answers may be downloaded as well as any messages for or from any study group. Upon logging in to any of these functions, the related activities and processes as described above may be engaged and performed 708. Upon exiting of the selected function 708, a message may be presented to the user to remember to launch the Interactive Study Aid and leave the computer on so that entertainment information can be updated on a nightly basis 710.

While the present invention has been described with regards to particular embodiments, it is recognized that additional variations of the present invention may be devised without departing from the inventive concepts.

INDUSTRIAL APPLICABILITY

It is an object of the present invention to provide an Interactive Study Aid that efficiently guides the student in understanding subject matter.

It is yet another object of the present invention to provide an Interactive Study Aid that allows the users to select the questions and answers to be studied.

It is yet another object of the present invention to provide an Interactive Study Aid that allows pre-processed questions and answers to be incorporated.

It is yet another object of the present invention to provide an Interactive Study Aid that allows for excitement packages or entertainment breaks to allow the student's mind to relax and recover from intensive study sessions.

It is yet another object of the present invention to provide an Interactive Study Aid that allows collaborative activity.

It is yet another object of the present invention to provide an Interactive Study Aid that allows collaborative activity between individual installations of the Interactive Study Aid of the present invention while restricting the ability to share activities and/or questions and answers.

It is yet another object of the present invention to allow the user to rate excitement packages, ads accompanying such excitement packages, and the goods or services advertised by such advertisements.

It is yet another object of the present invention to provide an Interactive Study Aid that allows generation of questions and answers from electronic information such as digital books, manual text entry by a student, and/or manual scanning via pen scanner or the like.

It is yet another object of the present invention to provide an Interactive Study Aid that uses an Intelligent Learning Agent in order to more efficiently allow the student to study, the Intelligent Learning Agent selecting questions for presentation to the student by pertinent criteria.

It is yet another object of the present invention to automate the process of restudying or relearning information that was once learned but subsequently forgotten.

These and other objects, advantages, and the industrial utility of the present invention will be apparent from a review of the accompanying specification and drawings.

What is claimed is:

1. A method for studying materials using machine implemented feedback techniques, the method comprising the computer implemented steps of:
   a person designating study material on a computer system;
   the person designating a specific portion of the designated study material on the computer system as the question and answer to a specific study question;
   the person designating a segment of the designated question and answer as the answer to the specific study question;
   the computer system designating the remaining non-designated segment of the designated question and answer as the question of the specific study question and reformatting the question to be in the form of a question;
the computer system displaying the designated question and answer, wherein the correct answer to the designated question is the answer designated by the person;
the person accepting the displayed designated question and answer or modifying the displayed question and answer and then accepting the modified question and answer;
the computer system storing the accepted question and answer;
the computer system querying the person with accepted questions;
the computer system gauging said person's response to said accepted questions according to said person's evaluation of an answer to said accepted questions; and
the computer system repeating accepted questions to said person according to said response; whereby said person is repeatedly questioned about materials about which said person has a weaker understanding in preference to materials about which said person has a stronger understanding, wherein the person is determining whether or not the person's answers to the specific questions are correct; wherein said person's evaluation of said answer is selected from the group consisting of: incorrect, correct and easy, correct and difficult.

2. The method for studying materials using machine-implemented feedback techniques of claim 1, wherein designating study material further comprises designating electronic or digital information materials selected from the group consisting of:
digital text;
student input; and
scanned materials.

3. The method for studying materials using machine-implemented feedback techniques of claim 2, wherein said digital text is selected from the group consisting of:
contents of a web site;
a digital book;
an electronic text file; and
a file of electronic information.

4. The method for studying materials using machine-implemented feedback techniques of claim 1, wherein designating study material further comprises:
designating material selected from the group consisting of:
fact-based materials;
fiction-based materials;
handwritten information including class notes;
pure equations;
jokes and stories;
expressed thought processes;
visually-based information;
audio-based information; and
audio-visual-based information.

5. The method for studying materials using machine-implemented feedback techniques of claim 2, wherein said scanned material further comprises:
information scanned by a scanner.

6. The method for studying materials using machine-implemented feedback techniques of claim 5, wherein said scanner comprises a handheld scanner.

7. The method for studying materials using machine-implemented feedback techniques of claim 1, wherein the question is selected from the group consisting of:
a drop-out question;
a true-false question;
a step-by-step multiple answer question;
a general knowledge question;
a multiple answer question;
a joke or story question;
a summary or association question and
an equation question.

8. The method for studying materials using machine-implemented feedback techniques of claim 1, wherein the method further comprises:
the person and computer system repeating the method to create additional specific study questions that comprise a plurality of questions to be associated with the designated material.

9. The method for studying materials using machine-implemented feedback techniques of claim 8, further comprising:
indicating a summary question after determining the plurality of questions.

10. The method for studying materials using machine-implemented feedback techniques of claim 7, further comprising:
indicating how information relates to material that the person has previously learned after determining a plurality of questions.

11. The method for studying materials using machine-implemented feedback techniques of claim 9, wherein said plurality of questions further comprises:
approximately 4 to 8 questions.

12. The method for studying materials using machine-implemented feedback techniques of claim 11, wherein said plurality of questions is machine defined.

13. The method for studying materials using machine-implemented feedback techniques of claim 9, wherein said plurality of questions further comprises:
indicating a summary question after determining a number of questions.

14. The method for studying materials using machine-implemented feedback techniques of claim 13, wherein said number of questions is selectable by said person.

15. The method for studying materials using machine-implemented feedback techniques of claim 1, wherein said querying said person further comprises:
querying said person according to information supplied by said person, said information selected from the group consisting of:
class and/or coursework information;
coursework information;
subject information;
project information;
prioritization of questions according to a likelihood of material to be tested; and
evaluation of prior query performance.

16. The method for studying materials using machine-implemented feedback techniques of claim 15, wherein said prioritization of questions according to a likelihood of material to be tested further comprises:
prioritization of questions according to a likelihood of material to be on a specific test.

17. The method for studying materials using machine-implemented feedback techniques of claim 1, wherein said step of gauging said person's response to said query further comprises:
determining a type of learner said person is by analyzing said person's interaction with said query.

18. The method for studying materials using machine-implemented feedback techniques of claim 17, wherein said step of re-querying said person further comprises:
re-querying said person according to said type of learner said person is.

19. The method for studying materials using machine-implemented feedback techniques of claim 1, further comprising:
designating backup information by the person, said backup information complementing said designated material, said backup information providing greater background for queries delivered to said person.

20. The method for studying materials using machine-implemented feedback techniques of claim 1, further comprising:
rating said designated material according to a possibility of being tested on said designated material.

21. The method for studying materials using machine-implemented feedback techniques of claim 20, wherein said step of rating said designated material according to a possibility of being tested on said designated material further comprises:
said person conducting said rating.

22. The method for studying materials using machine-implemented feedback techniques of claim 20, wherein said step of rating said designated material according to a possibility of being tested on said designated material further comprises:
rating said designated material according to a possibility of being tested on said designated material, a second person indicating said rating where said second person has or had experience with said material or a class using said material.

23. The method for studying materials using machine-implemented feedback techniques of claim 22, wherein said step of rating said designated material according to a possibility of being tested on said designated material further comprises:
accumulating data from previous persons who have taken a same class and who designated and/or rated material according to a possibility of being on a specific test.

24. The method for studying materials using machine-implemented feedback techniques of claim 1, wherein said step of querying a student further comprises:
providing entertainment subsequent to said query by the computer system.

25. The method for studying materials using machine-implemented feedback techniques of claim 24, wherein said query is a final query in a group of queries.

26. The method for studying materials using machine-implemented feedback techniques of claim 24, wherein said step of providing entertainment further comprises:
providing entertainment based upon criteria selected from the group consisting of:
a profile associated with said person; and
a response evaluation arising from a prior entertainment.

27. The method for studying materials using machine-implemented feedback techniques of claim 26, further comprising:
rating of said entertainment by said person.

28. The method for studying materials using machine-implemented feedback techniques of claim 24, further comprising:
providing advertisement in association with said entertainment.

29. The method for studying materials using machine-implemented feedback techniques of claim 28, wherein said step of providing advertisement further comprises:
rating said advertisement by said person.

30. The method for studying materials using machine-implemented feedback techniques of claim 29, wherein said step of rating said advertisement is selected from steps in the group consisting of:
rating said advertisement, said student indicating appeal of said advertisement; and
rating one of a product and service advertised by said advertisement, said person indicating appeal of said one of advertised product and service.

31. The method for studying materials using machine-implemented feedback techniques of claim 1, further comprising:
sharing said query with a second person.

32. The method for studying materials using machine-implemented feedback techniques of claim 31, wherein said step of sharing said query is selected from steps in the group consisting of:
sharing said query over a computer network;
sharing said query by posting said query to a database of queries accessible by a computer network.

33. The method for studying materials using machine-implemented feedback techniques of claim 32, wherein said step of sharing said query further comprises:
limiting those with whom said query may be shared.

34. The method for studying materials using machine-implemented feedback techniques of claim 1, wherein said step of processing said designated material to provide a query further comprises:
pre-processing coursework materials into the computer system to provide pre-processed coursework material for direct incorporation and use by said person; and
transmitting said pre-processed coursework material to said person.

35. The method for studying materials using machine-implemented feedback techniques of claim 34, further comprising:
encrypting said pre-processed coursework material so that only said person may use said pre-processed coursework material.

36. The method for studying materials using machine-implemented feedback techniques of claim 35, wherein said step of encrypting said pre-processed coursework material further comprises:
providing an encryption code specific to said person; and
encrypting coursework or other types of material to said person's encryption code.

37. The method for studying materials using machine-implemented feedback techniques of claim 36, wherein said step of encrypting coursework or other types of material occurs at a time selected from the group consisting of:
prior to said material being transmitted to the student, during transmission to the student, and after said material is transmitted to the person.

38. A method for studying educational materials using machine-implemented feedback techniques, the computer implemented steps comprising:
a person designating material for studying within a computer system to provide designated material;
said designated material selected from the group consisting of digital text, student input, scanned materials, fact-based materials, fiction based materials, handwritten information including class notes, pure equations, expressed thought processes, jokes and stories, visually-based information, audio-based information, audio-visual-based information, and pre-processed coursework material;

said digital text selected from the group consisting of contents of a web site, a digital book, and an electronic text file or other electronic information file;
said scanned text further comprising printed or handwritten text scanned by a handheld scanner;
the person processing said designated material within the computer system to create a set of queries, including:
   determining an item for learning present in said designated material by said person and determining a question by the computer system for querying the person regarding said item so that said person may be queried regarding said item by posing said question,
   said step of determining a question for querying said person selected from the group consisting of determining a drop-out question, determining a true-false question, determining a step-by-step multiple answer question, determining a general knowledge question, determining a multiple answer question, determining a joke or story question, determining a summary or association question and determining an equation question;
   said step of determining a question for querying said person further comprising indicating a portion of said designated material to be used as said question and indicating a portion of said designated material to be used as said answer;
   indicating a summary question after determining approximately 4 to 8 questions;
   rating said designated material according to a possibility of being tested on said designated material, said person conducting said rating;
   designating backup information, said backup information complementing said designated material, said backup information providing greater background for queries delivered to said person;
   querying said person with said query and according to information supplied by said person, said information selected from the group consisting of class and/or coursework information, subject information, project information, prioritization of questions according to a likelihood of material to be tested, and evaluation of prior query performance;
   providing a machine-generated hint when the person asks for a hint;
   gauging said person's response to said query including determining a type of learner said person is by analyzing said person's interaction with said query and including gauging said person's response according to said person's self-evaluation of an answer to said query, said person's self-evaluation of said answer selected from the group consisting of incorrect, correct and easy, correct and difficult;
   re-querying said person according to said response and according to said type of learner said person is and according to said person's self-evaluation of a prior answer to said query;
   providing entertainment based upon criteria selected from the group consisting of a profile associated with said person and a response evaluation arising from a prior entertainment;
   rating of said entertainment by said person;
   providing advertisement in association with said entertainment;
   rating said advertisement by said person, said rating of said advertisement selected from steps in the group consisting of rating said advertisement, said person indicating appeal of said advertisement, and rating a product or service advertised by said advertisement, said person indicating appeal of said advertised product or service;
   selectively sharing said query with a second person, said query subject to limitations restricting those with whom said query may be shared, said sharing of said query selected from steps in the group consisting of sharing said query over a computer network and sharing said query by posting said query to a database of queries accessible by a computer network; whereby
   said person is repeatedly queried regarding materials said person has weaker understanding in preference to materials said person has stronger understanding and allowing said person to learn study materials faster and more efficiently; and
   wherein the person is determining whether or not the person's answers to the specific questions are correct.

39. The method for studying materials using machine-implemented feedback techniques of claim 38, further comprising:
   allowing said person to override any preference system and study all questions equally.

40. The method for studying materials using machine-implemented feedback techniques of claim 38, wherein said step of processing said designated material to provide a query further comprises:
   pre-processing coursework materials to provide pre-processed coursework material for direct incorporation and use by said person; and
   transmitting said pre-processed coursework material to said person.

41. The method for studying materials using machine-implemented feedback techniques of claim 40, further comprising:
   encrypting said pre-processed coursework material so that only said person may use said pre-processed coursework material.

42. The method for studying materials using machine-implemented feedback techniques of claim 38, further comprising:
   predesigned templates that have built-in functions to enhance learning and to help a person study;
   helping a person place material to be learned into said templates where said person selects said material to be learned;
   saving said material separate from the templates so that said material can be called up and placed in a proper template for study;
   assigning portions of material selected by said person in unique colors;
   showing said portions of said material to said person in said assigned colors;
   allowing said person to select which learned information said person wants to keep active in said person's memory;
   querying said person on said selected information at defined intervals, said intervals being definable by said person;
   archiving information studied by said person so that it can easily be recalled by a machine at a later date and re-taught to said person in a same way as said person first learned said archived information;
   querying said person after said student has finished a test to determine what questions were on said test; and
   using information derived from said post-test query to adjust teaching similar information to said person in the future.

43. The method for studying materials using machine-implemented feedback techniques of claim 42, further comprising:
  taking results of 2 or more of said post-test queries and combining said post-test query information to develop a list of information other person's should learn who will take a same class in the future;
  securing said post-test query information and sharing it with selected person's; and
  allowing said person to select which learned information said person wants to keep active in said person's memory and querying said person on said selected information at intervals where said intervals are selectable by machine.

44. The method for studying materials using machine-implemented feedback techniques of claim 42, further comprising:
  stimulating said person's understanding by asking said person to create summary questions;
  prompting said person to try to associate first information with second information that said person learned previously;
  said person selecting key information in a sentence or paragraph selected by said person;
  playing background music during said student's studying to improve retention and make studying more enjoyable and effective;
  recording, learning and cataloging jokes and stories;
  recording when and to what person or group a person told one of said jokes or stories; and
  cataloging and managing a selected list of said jokes and stories.

45. A method for studying materials using machine-implemented feedback techniques, the computer implemented steps comprising:
  a user designating material for studying within the computer system to provide designated material;
  the user processing said designated material within the computer system to enable a learning or sharing purpose;
  the computer system presenting the user with said processed designated material in an exhibition a template query;
  selecting an item for learning present in said designated material and
  determining an important portion of said item;
  the computer system selecting a question for querying said user regarding said item, with said user queried regarding said item by posing said question in the template query;
  the computer system gauging said user's response to said exhibition template query according to said user's evaluation of an answer to said template query;
  the computer system re-presenting said processed designated material to said user according to said response; with said user repeatedly presented with exhibition template queries regarding materials said user desires better familiarity in preference to other materials; and
  wherein user determines whether or not the user answers the questions correctly; wherein said user's evaluation of said answer is selected from the group consisting of: an indication of said answer being incorrect, an indication of said answer being correct, an indication of said answer being correct and easy, and an indication of said answer being correct and difficult.

46. The method for studying materials using machine-implemented feedback techniques of claim 45, wherein said step of designating material further comprises designating electronic or digital information materials selected from the group consisting of:
  digital text;
  user input; and
  scanned materials.

47. The method for studying materials using machine-implemented feedback techniques of claim 46, wherein said digital text is selected from the group consisting of:
  contents of a web site;
  a digital book;
  an electronic text file; and
  a file of electronic information.

48. The method for studying materials using machine-implemented feedback techniques of claim 45, wherein said step of designating material further comprises:
  designating material selected from the group consisting of:
  fact-based materials;
  fiction-based materials;
  handwritten information including class notes;
  pure equations;
  jokes and stories;
  expressed thought processes;
  visually-based information;
  audio-based information; and
  audio-visual-based information.

49. The method for studying materials using machine-implemented feedback techniques of claim 46, wherein said scanned material further comprises:
  information scanned by a scanner.

50. The method for studying materials using machine-implemented feedback techniques of claim 49, wherein said scanner comprises a handheld scanner.

51. The method for studying materials using machine-implemented feedback techniques of claim 45, wherein said step of determining important portion of said item further comprises:
  determining a key word or phrase for use to automatically create a query.

52. The method for studying materials using machine-implemented feedback techniques of claim 45, wherein said step of determining a question for querying said user is selected from the group consisting of:
  a drop-out question;
  a true-false question;
  a step-by-step multiple answer question;
  a general knowledge question;
  a multiple answer question;
  a joke or story question;
  a summary or association question; and
  an equation question.

53. The method for studying materials using machine-implemented feedback techniques of claim 45, wherein said step of selecting a question for querying said user further comprises:
  indicating a portion of said designated material to be used as said question; and
  indicating a portion of said designated material to be used as said answer.

54. The method for studying materials using machine-implemented feedback techniques of claim 53, further comprising:
  using said indicated question portion to create a query; and
  storing said query for future use, including use in a query session.

55. The method for studying materials using machine-implemented feedback techniques of claim 52, further comprising:
    indicating a summary question after determining a plurality of questions.

56. The method for studying materials using machine-implemented feedback techniques of claim 52, further comprising:
    indicating how information relates to material that the user has previously learned after determining a plurality of questions.

57. The method for studying materials using machine-implemented feedback techniques of claim 55, wherein said plurality of questions further comprises:
    approximately 4 to 8 questions.

58. The method for studying materials using machine-implemented feedback techniques of claim 57, wherein said plurality of questions is machine defined.

59. The method for studying materials using machine-implemented feedback techniques of claim 55, wherein said plurality of questions further comprises:
    indicating a summary question after determining a number of questions.

60. The method for studying materials using machine-implemented feedback techniques of claim 59, wherein said number of questions is selectable by said user.

61. The method for studying materials using machine-implemented feedback techniques of claim 45, wherein said step of presenting said user with an exhibition a template query further comprises:
    querying said user according to information supplied by said user, said information selected from the group consisting of:
    class and/or coursework information;
    coursework information;
    subject information;
    project information;
    prioritization of questions according to a likelihood of material for which knowledge is to be demonstrated; and
    evaluation of prior query performance.

62. The method for studying materials using machine-implemented feedback techniques of claim 61, wherein said prioritization of questions according to a likelihood of material for which knowledge is to be demonstrated further comprises:
    prioritization of questions according to a likelihood of material to be needed for a specific knowledge demonstration.

63. The method for studying materials using machine-implemented feedback techniques of claim 45, wherein said step of gauging said user's response to said exhibition template query further comprises:
    determining a type of learner said user is by analyzing said user's interaction with said exhibition template query.

64. The method for studying materials using machine-implemented feedback techniques of claim 63, wherein said step of re-presenting said designated material to said user further comprises:
    re-presenting said designated material to said user according to said type of learner said user is.

65. The method for studying materials using machine-implemented feedback techniques of claim 45, further comprising:
    designating backup information by the user, said backup information complementing said designated material, said backup information providing greater background for exhibitions template query presented to said user.

66. The method for studying materials using machine-implemented feedback techniques of claim 45, further comprising:
    rating said designated material according to a possibility of needing to demonstrate knowledge on said designated material.

67. The method for studying materials using machine-implemented feedback techniques of claim 66, wherein said step of rating said designated material according to a possibility of needing to demonstrate knowledge on said designated material further comprises:
    said user conducting said rating.

68. The method for studying materials using machine-implemented feedback techniques of claim 66, wherein said step of rating said designated material according to a possibility of needing to demonstrate knowledge on said designated material further comprises:
    rating said designated material according to a possibility of needing to demonstrate knowledge on said designated material, a second user indicating said rating where said second user has or had experience with said material.

69. The method for studying materials using machine-implemented feedback techniques of claim 68, wherein said step of rating said designated material according to a possibility of needing to demonstrate knowledge on said designated material further comprises:
    accumulating data from previous users who have familiarity with said designated material and who designated and/or rated material according to a possibility of being on a specific test.

70. The method for studying materials using machine-implemented feedback techniques of claim 45, wherein said step of presenting said user with an exhibition a template query further comprises:
    providing entertainment subsequent to said exhibition template query.

71. The method for studying materials using machine-implemented feedback techniques of claim 70, wherein said step of providing entertainment subsequent to said exhibition template query further comprises:
    providing entertainment subsequent to said exhibition template query after a designated period of time.

72. The method for studying materials using machine-implemented feedback techniques of claim 71, wherein said designated period of time is determined by a member of the group consisting of:
    said user, a machine implementing the method for studying materials, another person, or another machine.

73. The method for studying materials using machine-implemented feedback techniques of claim 70, wherein said exhibition template query is a final exhibition template query in a group of exhibition template queries.

74. The method for studying materials using machine-implemented feedback techniques of claim 70, wherein said step of providing entertainment further comprises:
    providing entertainment based upon criteria selected from the group consisting of:
    a profile associated with said user and a response evaluation arising from a prior entertainment.

75. The method for studying materials using machine-implemented feedback techniques of claim 74, further comprising:
    rating of said entertainment by said user.

76. The method for studying materials using machine-implemented feedback techniques of claim 70, further comprising:

providing advertisement in association with said entertainment.

77. The method for studying materials using machine-implemented feedback techniques of claim 76, wherein said step of providing advertisement further comprises:
   rating said advertisement by said user.

78. The method for studying materials using machine-implemented feedback techniques of claim 77, wherein said step of rating said advertisement is selected from steps in the group consisting of:
   rating said advertisement, said user indicating appeal of said advertisement; and
   rating one of a product and service advertised by said advertisement, said user indicating appeal of said one of advertised product and service.

79. The method for studying materials using machine-implemented feedback techniques of claim 45, further comprising:
   sharing said exhibition template query with a second user.

80. The method for studying materials using machine-implemented feedback techniques of claim 79, wherein said step of sharing said exhibition template query is selected from steps in the group consisting of:
   sharing said exhibition template query over a computer network;
   sharing said exhibition template query by posting said exhibition template query to a database of exhibition template queries accessible by a computer network.

81. The method for studying materials using machine-implemented feedback techniques of claim 80, wherein said step of sharing said exhibition template query further comprises:
   limiting those with whom said exhibition template query may be shared.

82. The method for studying materials using machine-implemented feedback techniques of claim 45, wherein said step of processing said designated material to enable a learning or sharing purpose further comprises:
   pre-processing materials to provide pre-processed material for direct incorporation and use by said user; and
   transmitting said pre-processed material to said user.

83. The method for studying materials using machine-implemented feedback techniques of claim 82, further comprising:
   encrypting said pre-processed material so that use said pre-processed material is limited.

84. The method for studying materials using machine-implemented feedback techniques of claim 83, further comprising:
   encrypting said pre-processed material so that only said user may use said pre-processed material.

85. The method for studying materials using machine-implemented feedback techniques of claim 84, wherein said step of encrypting said pre-processed material further comprises:
   providing an encryption code specific to said user; and
   encrypting coursework or other types of material to said user's encryption code.

86. The method for studying materials using machine-implemented feedback techniques of claim 85, wherein said step of encrypting coursework or other types of material occurs at a time selected from the group consisting of:
   prior to said material being transmitted to the student, during transmission to the student, and after said material is transmitted to the student.

87. A method for studying educational materials using machine-implemented feedback techniques, the computer implemented steps comprising:
   a user designating material for studying into a computer system to provide designated material;
   said designated material selected from the group consisting of digital text, user input, scanned materials, fact-based materials, fiction based materials, handwritten information including class notes, pure equations, expressed thought processes, jokes and stories, visually-based information, audio-based information, audio-visual-based information, and pre-processed material;
   said digital text selected from the group consisting of contents of a web site, a digital book, and an electronic text file or other electronic information file;
   said scanned text further comprising printed or handwritten text scanned by a handheld scanner;
   the user processing said designated material within the computer system to enable a learning or sharing purpose, including determining an item for learning present in said designated material and the computer system determining an exhibition for presenting to a user regarding said item so that said user may be made familiar with said item by presenting said exhibition,
   said step of determining an exhibition including determining a question for querying said user selected from the group consisting of determining a drop-out question, determining a true-false question, determining a step-by-step multiple answer question, determining a general knowledge question, determining a multiple answer question, determining a joke or story question, determining a summary or association question and determining an equation question;
   said step of determining a question for querying said user further comprising indicating a portion of said designated material to be used as said question and indicating a portion of said designated material to be used as said answer;
   indicating a summary question after determining approximately 4 to 8 questions;
   rating said designated material according to a possibility of needing to demonstrate knowledge on said designated material, said user conducting said rating;
   designating backup information, said backup information complementing said designated material, said backup information providing greater background for exhibitions presented to said user;
   querying said user with said query and according to information supplied by said user, said information selected from the group consisting of class and/or coursework information, subject information, project information, prioritization of questions according to a likelihood of material for which knowledge is to be demonstrated, and evaluation of prior query performance;
   providing a machine-generated hint when the user asks for a hint;
   gauging said user's response to said exhibition including determining a type of learner said user is by analyzing said user's interaction with said exhibition and including gauging said user's response according to said user's self-evaluation of said exhibition, said user's self-evaluation of said exhibition including and evaluation of an answer, said evaluation of said answer selected from indications of the group consisting of incorrect, correct and easy, correct and difficult;

re-presenting said exhibition to said user according to said response and according to said type of learner said user is and according to said user's self-evaluation of a prior response to said exhibition;

providing entertainment based upon criteria selected from the group consisting of a profile associated with said user and a response evaluation arising from a prior entertainment;

rating of said entertainment by said user;

providing advertisement in association with said entertainment;

rating said advertisement by said user, said rating of said advertisement selected from steps in the group consisting of rating said advertisement, said user indicating appeal of said advertisement, and rating a product or service advertised by said advertisement, said user indicating appeal of said advertised product or service;

selectively sharing said exhibition with a second user, said exhibition subject to limitations restricting those with whom said exhibition may be shared, said sharing of said exhibition selected from steps in the group consisting of sharing said exhibition over a computer network and sharing said exhibition by posting said exhibition to a database of exhibitions accessible by a computer network; whereby said user is repeatedly presented with exhibitions regarding materials said user has weaker understanding in preference to materials said user has stronger understanding and allowing said user to learn materials faster and more efficiently and wherein the user determines whether or not the user answers the questions correctly.

88. The method for studying materials using machine-implemented feedback techniques of claim 87, further comprising:

allowing said user to override any preference system and review all exhibitions equally.

89. The method for studying materials using machine-implemented feedback techniques of claim 87, wherein said step of processing said designated material to enable a learning or sharing purpose further comprises:

pre-processing materials to provide pre-processed material for direct incorporation and use by said user; and transmitting said pre-processed material to said user.

90. The method for studying materials using machine-implemented feedback techniques of claim 89, further comprising:

encrypting said pre-processed material so that only said user may use said pre-processed material.

91. The method for studying materials using machine-implemented feedback techniques of claim 87, further comprising:

predesigned templates that have built-in functions to enhance learning and to help a user study;

helping a user place material to be learned into said templates where said user selects said material to be learned;

saving said material separate from the templates so that said material can be called up and placed in a proper template for study;

assigning portions of material selected by said user in unique colors;

showing said portions of said material to said user in said assigned colors;

allowing said user to select which learned information said user wants to keep active in said user's memory;

querying said user on said selected information at defined intervals, said intervals being definable by said user;

archiving information studied by said user so that it can easily be recalled by a machine at a later date and re-taught to said user in a same way as said user first learned said archived information;

querying said user after said user has finished a test or other demonstration of knowledge to determine what questions or materials were on said test or demonstration; and using information derived from said post-test/demonstration query to adjust teaching similar information to said user in the future.

92. The method for studying materials using machine-implemented feedback techniques of claim 91, further comprising:

taking results of two or more of said post-test/demonstration queries and combining said post-test/demonstration query information to develop a list of information other users should learn who will require familiarity with similar materials in the future;

securing said post-test/demonstration query information and sharing it with selected users; and allowing said user to select which learned information said user wants to keep active in said user's memory and querying said user on said selected information at intervals where said intervals are selectable by machine.

93. The method for studying materials using machine-implemented feedback techniques of claim 91, further comprising:

stimulating said user's understanding by asking said user to create a summary;

prompting said user to try to associate first information with second information that said user learned previously;

said user selecting key information in a sentence or paragraph selected by said user;

playing background music during said user's studying to improve retention and make studying more enjoyable and effective;

recording, learning and cataloging jokes and stories;

recording when and to what person or group a user told one of said jokes or stories; and cataloging and managing a selected list of said jokes and stories.

94. A method of designating parts of material to be processed and stored for user defined research, writing, speaking, and/or presentation purposes, the computer implemented steps comprising:

the user designating material to be processed and stored within a computer system by the user to provide designated material;

the user processing said designated material to enable a learning or sharing purpose for one or more users to provide processed materials;

the user selecting an item from the designated and processed material for learning or sharing and identifying an answer to a specific question;

the computer system presenting the user with said item from said processed materials to provide an exhibition of said item from said processed materials to said user;

the computer system gauging said user's response to said exhibition according to said user's evaluation of an answer to said exhibition; and the computer system re-exhibiting said processed materials to said user according to said response; whereby, with said user repeatedly exposed to exhibitions regarding materials with which said user desires greater familiarity with and understanding in preference to materials with which said user does not desire greater familiarity with and understanding; wherein said user's evaluation of an answer to said exhibition is selected from the group consisting of: incorrect, correct, correct and easy, and correct and difficult.

95. A method of designating parts of material to be processed and stored for user defined research, writing, speaking, and/or presentation purposes as set forth in claim 94, further the steps comprising:

associating a unique title with said designated material.

96. A method of designating parts of material to be processed and stored for user defined research, writing, speaking, and/or presentation purposes as set forth in claim 94, further the steps comprising:

associating a title with said designated material which is the same as that used for other designated materials.

97. A method of designating parts of material to be processed and stored for user defined research, writing, speaking, and/or presentation purposes as set forth in claim 94, further the steps comprising:

assigning a priority number to said designated material.

98. A method of designating parts of material to be processed and stored for user defined research, writing, speaking, and/or presentation purposes as set forth in claim 97, further the steps comprising:

using said priority number to organize said designated material for a specific purpose.

* * * * *